(12) United States Patent
Nakamura

(10) Patent No.: US 9,141,326 B2
(45) Date of Patent: Sep. 22, 2015

(54) PRINTING APPARATUS, METHOD OF CONTROLLING PRINTING APPARATUS, AND STORAGE MEDIUM

(71) Applicant: CANON KABUSHIKI KAISHA, Tokyo (JP)

(72) Inventor: Tadahiro Nakamura, Yokohama-shi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/183,354

(22) Filed: Feb. 18, 2014

(65) Prior Publication Data

US 2014/0240766 A1    Aug. 28, 2014

(30) Foreign Application Priority Data

Feb. 22, 2013  (JP) ................................. 2013-033422

(51) Int. Cl.
*G06F 3/12*  (2006.01)
*G06K 15/00*  (2006.01)

(52) U.S. Cl.
CPC ............ *G06F 3/1292* (2013.01); *G06F 3/1205* (2013.01); *G06F 3/1257* (2013.01); *G06F 3/1258* (2013.01)

(58) Field of Classification Search
CPC .................... H04N 21/43637; H04N 21/2223; H04W 48/20
See application file for complete search history.

(56) References Cited

U.S. PATENT DOCUMENTS

2013/0100486 A1* 4/2013 Mccoog et al. ............... 358/1.15
2013/0148162 A1* 6/2013 Park et al. .................... 358/1.15

FOREIGN PATENT DOCUMENTS

JP        2012-199884 A     10/2012

* cited by examiner

*Primary Examiner* — Thomas Lett
(74) *Attorney, Agent, or Firm* — Canon USA Inc. IP Division

(57) ABSTRACT

A printing apparatus capable of performing wireless communication with an information processing apparatus includes a display unit configured to display a connection screen for enabling, on the screen, specification of print settings of print data received from the information processing apparatus using the wireless communication, and reception of an instruction for executing connection processing for establishing the wireless communication, a storage unit configured to store the print settings specified via the connection screen, a connection unit configured to execute the connection processing with the information processing apparatus when the instruction for executing the connection processing is received via the connection screen, a reception unit configured to receive print data from the information processing apparatus using the wireless communication established by the connection processing, and a printing unit configured to print the print data received by the reception unit based on the print settings stored in the storage unit.

8 Claims, 18 Drawing Sheets

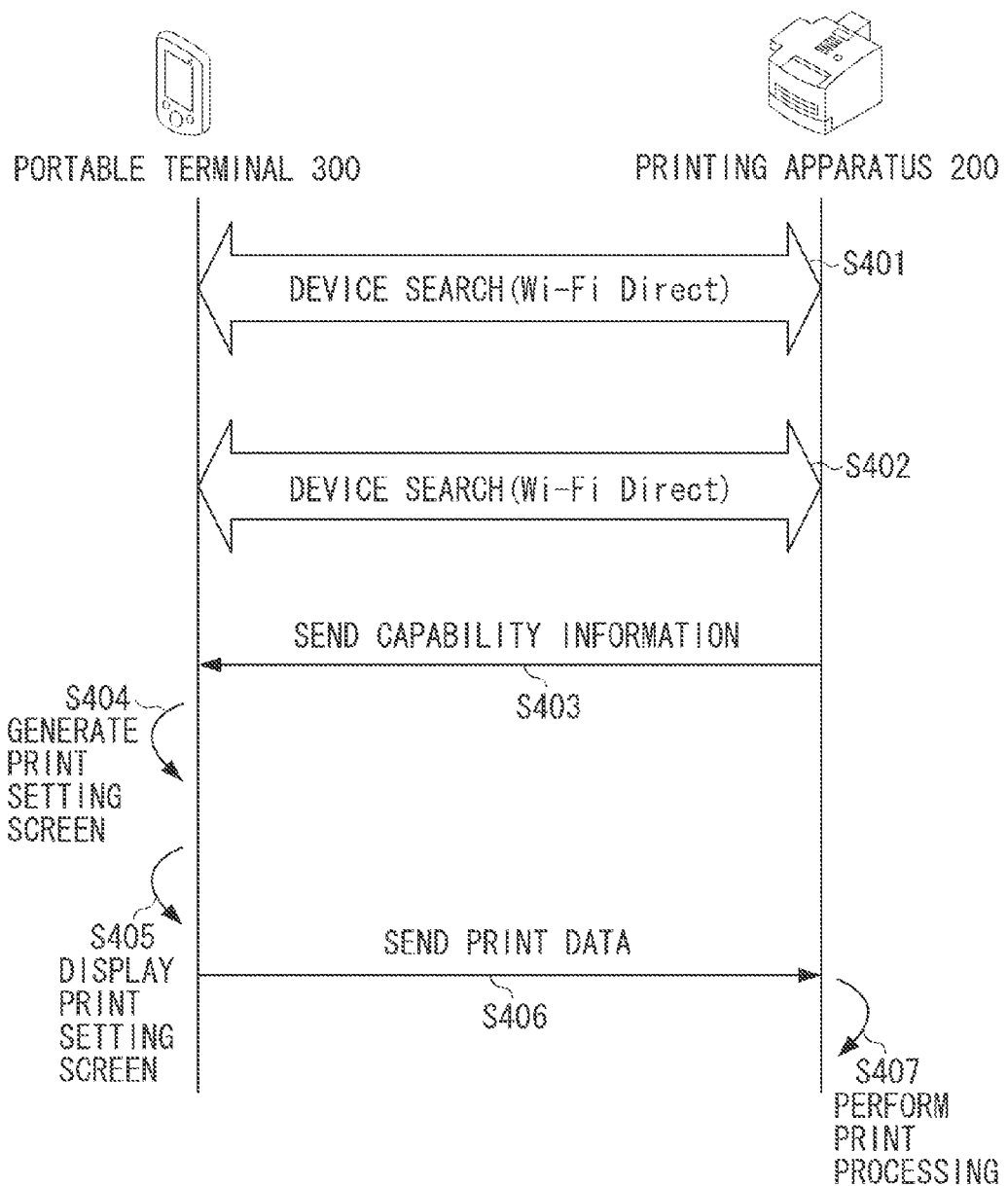

SCREEN 500

SCREEN 510

FIG. 6A

```
COLOR PRINTING : COLOR
TWO-SIDED PRINTING : ONE-SIDED PRINTING, TWO-SIDED PRINTING
                    (LONG-EDGE BINDING, SHORT-EDGE BINDING)
N-UP PRINTING: 2in 1,4in 1
```
CAPABILITY INFORMATION 600

FIG. 6B

```
COLOR PRINTING : MONOCHROME
TWO-SIDED PRINTING : ONE-SIDED PRINTING
N-UP PRINTING: 2in 1,4in 1
```
CAPABILITY INFORMATION 610

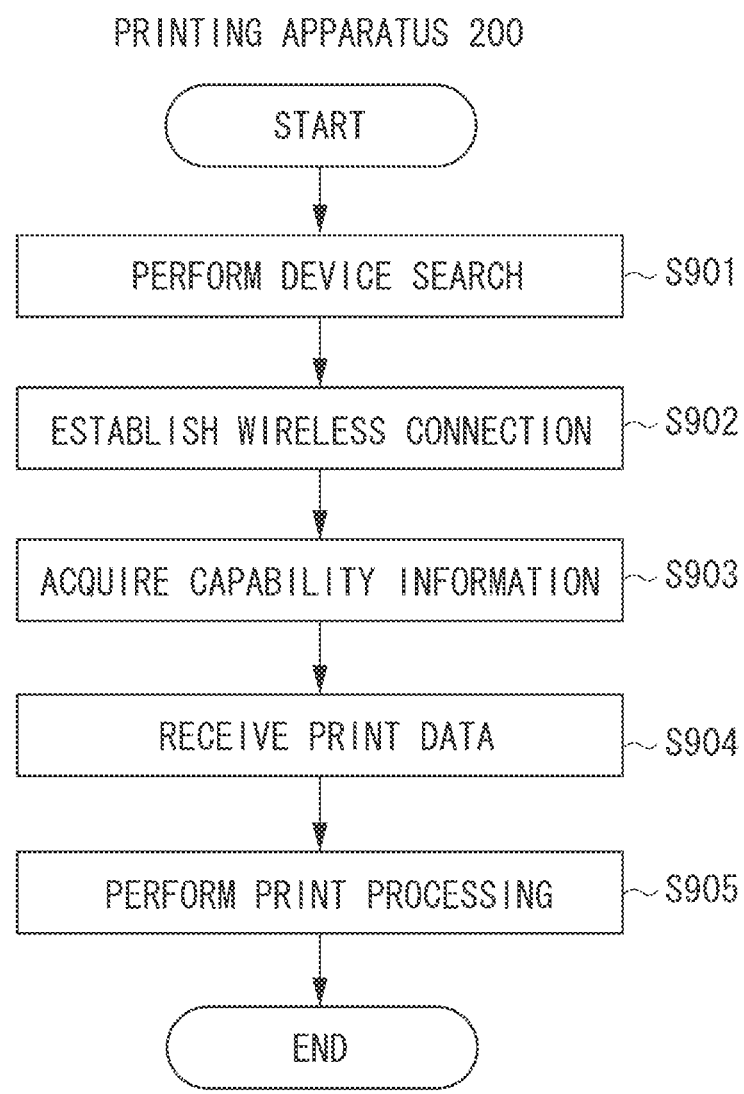

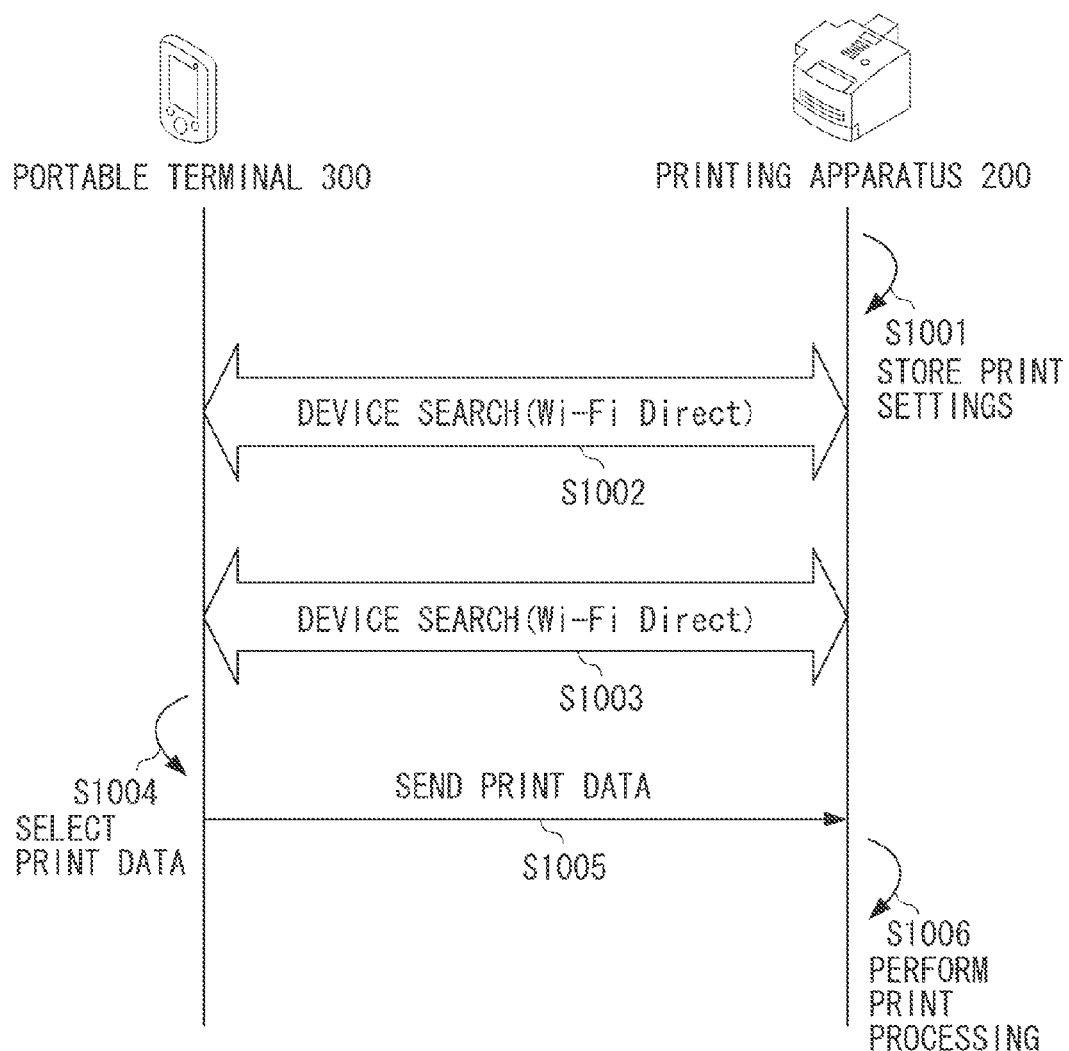

SCREEN 1100

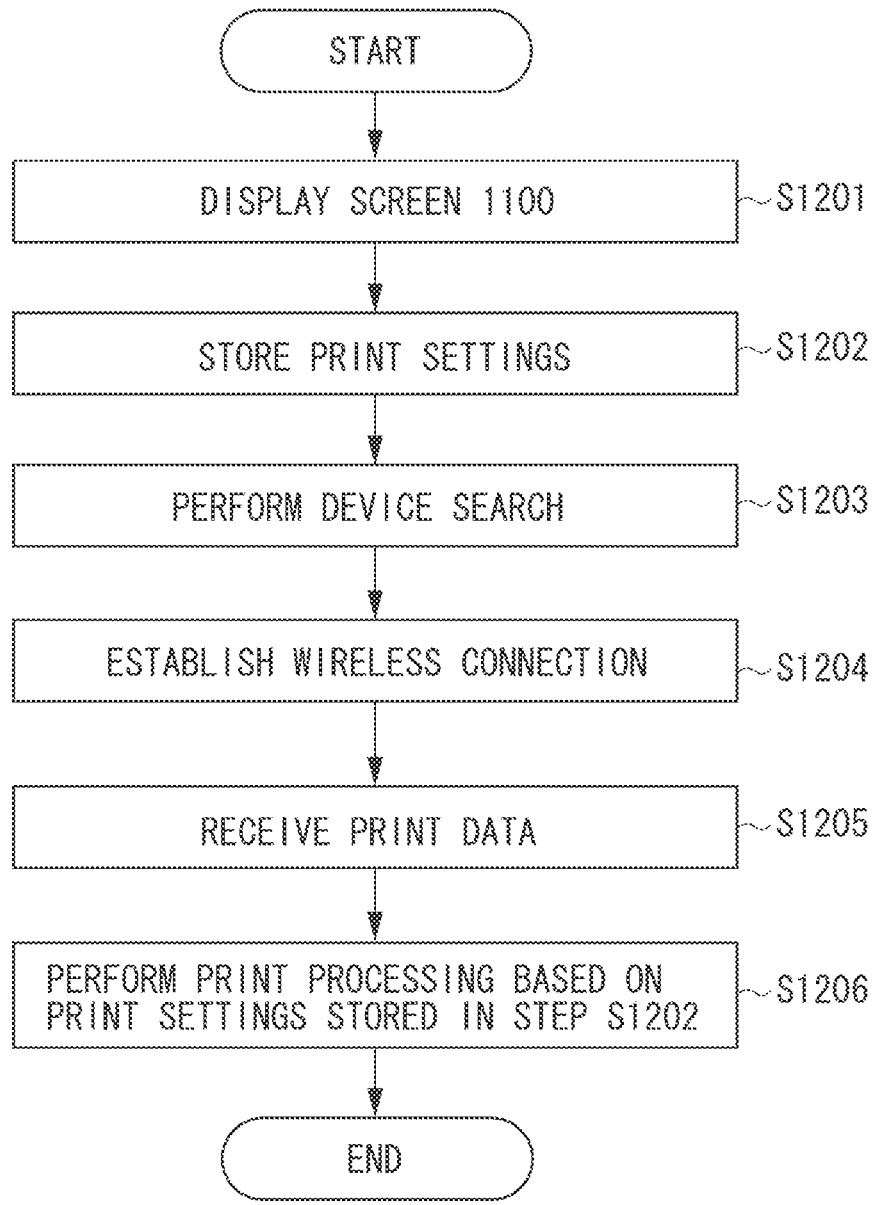

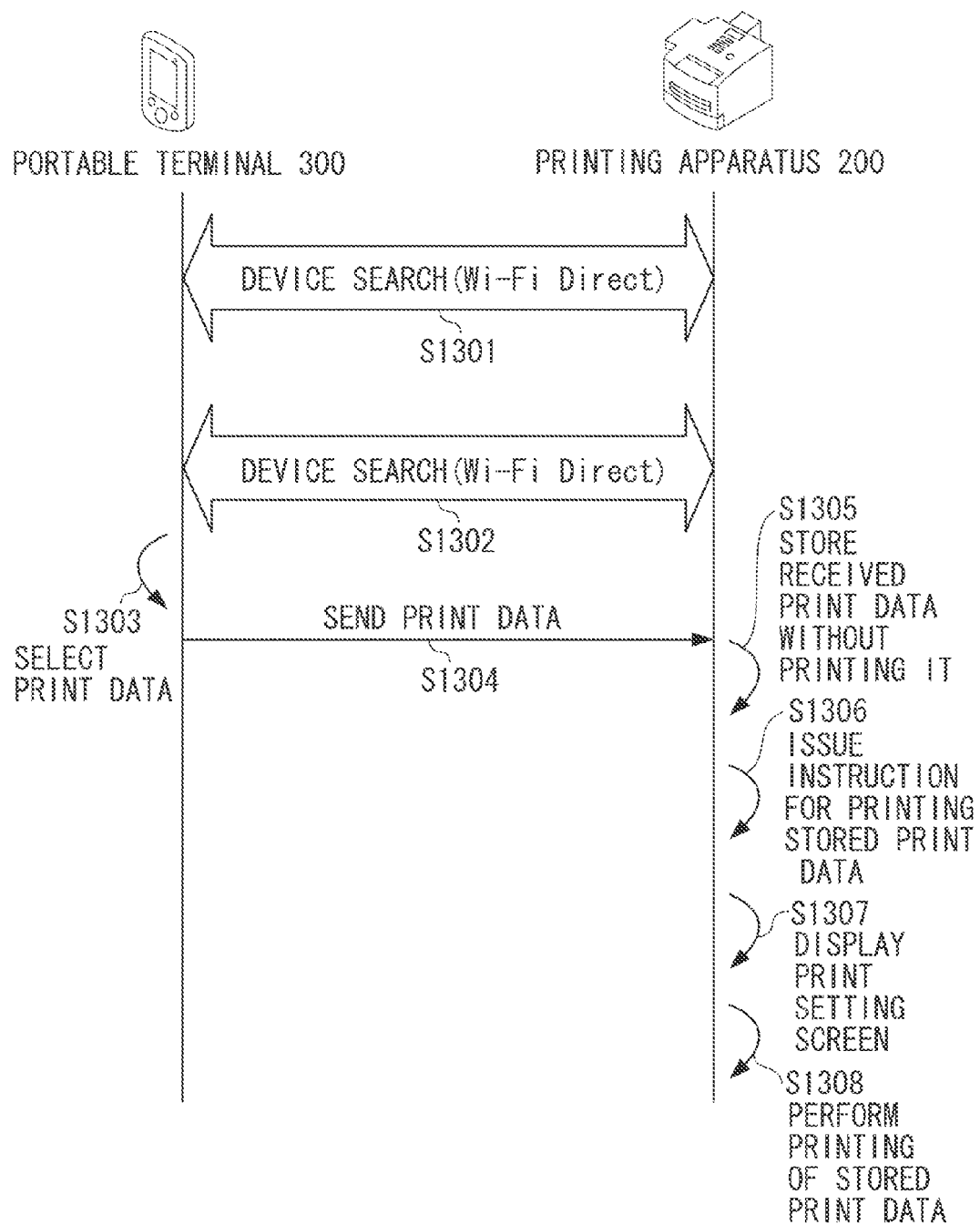

SCREEN 1400

FIG. 14B

```
Wi-Fi Direct RECEIVED JOB

PRINT SETTINGS OF JOB 1

1411  COLOR        [ COLOR                          ▼ ]
        PRINTING

1412  TWO-SIDED    [ TWO-SIDED PRINTING             ▼ ]
        PRINTING       (LONG-EDGE BINDING)

1413  N-UP         [ 2 in 1                         ▼ ]
        PRINTING

1414 ~ [ OK ]  [ RETURN ]
```

SCREEN 1410

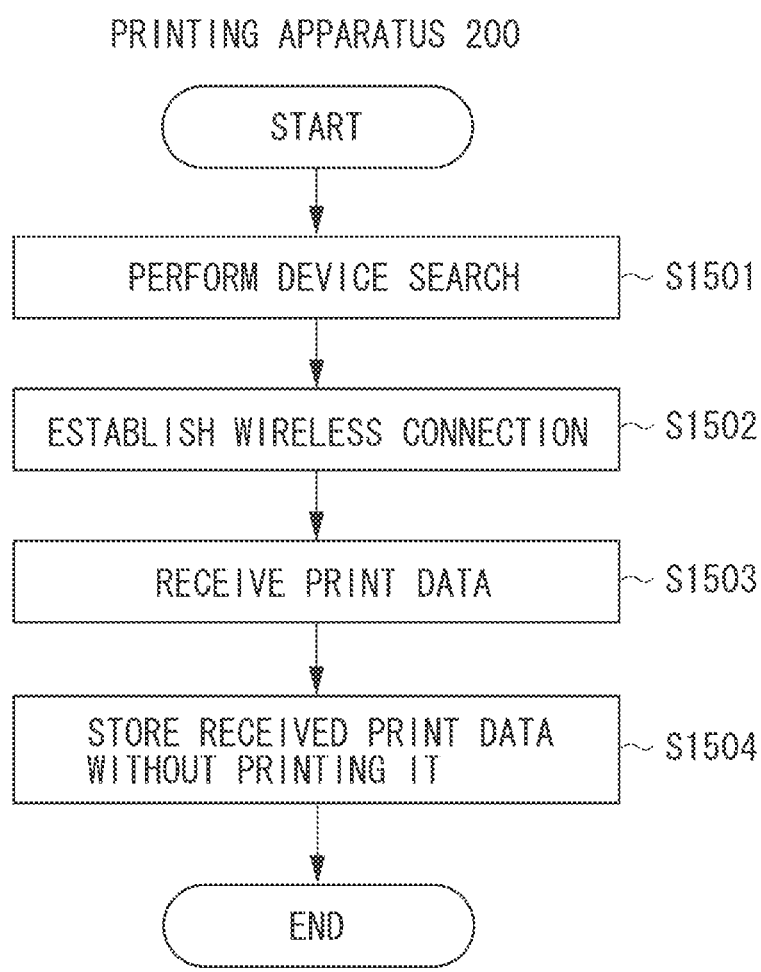

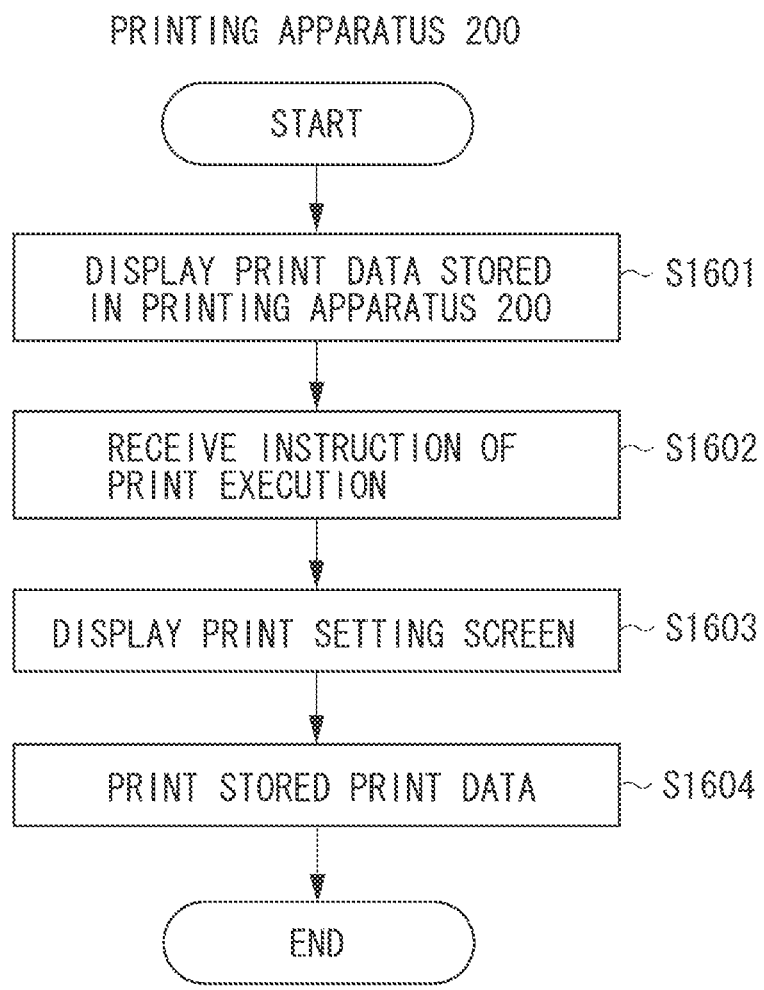

PRINTING APPARATUS, METHOD OF CONTROLLING PRINTING APPARATUS, AND STORAGE MEDIUM

BACKGROUND OF THE INVENTION

1. Field of the Invention

The present invention generally relates to printing and, more particularly, to a printing apparatus, a method for controlling a printing apparatus, and a storage medium.

2. Description of the Related Art

Information processing apparatuses having a wireless local area network (LAN) function such as printing apparatuses, personal computers (PCs), and portable terminals, have been increasing. The information processing apparatus having the wireless LAN function connects as a client to an access point, and via the access point, communicates with an external device.

The Wi-Fi Alliance has established a standard called Wi-Fi Direct (registered trademark). Wi-Fi Direct has defined a protocol for determining whether an information processing apparatus such as a printing apparatus and a PC operates as an access point or a client. Execution of the protocol automatically determines an information processing apparatus which is to be the access point and an information processing apparatus which is to be the client. The use of Wi-Fi Direct eliminates requirement for preparation of a specific access point, and enables direct wireless communication between the information processing apparatuses.

FIG. 1 simply illustrates a processing sequence in Wi-Fi Direct. Each of the printing apparatus and the portable terminal is an example of the information processing apparatuses that support Wi-Fi Direct.

In step S101, each of the printing apparatus and the portable terminal performs a device search to identify a communication partner. In step S102, the printing apparatus and the portable terminal identify the communication partners respectively, and the printing apparatus and the terminal determine which one is to be an access point (Group Owner) and which one is to be a client (Client). The processing in step S102 is called a role determination. In FIG. 1, it is assumed that as a result of the role determination in step S102, it is determined that the printing apparatus is to be the Group Owner, and the portable terminal is to be the Client.

In step S103, using Wi-Fi Protected Setup (WPS) specified by the Wi-Fi Alliance, the printing apparatus acting as the Group Owner provides parameters for communication to the portable terminal acting as the Client to share the parameters between the printing apparatus and the portable terminal. In step S104, using the parameters, the printing apparatus and the portable terminal perform secure connection.

When the secure connection is completed, in step S105, the printing apparatus and the printing terminal perform addressing for carrying out Internet Protocol (IP) communication. In this step, the printing apparatus acting as the Group Owner, operates as a dynamic host configuration protocol (DHCP) server, and assigns an IP address to the portable terminal acting as the Client.

The execution of the above-described processing establishes wireless communication between the printing apparatus and the portable terminal. The use of the wireless communication enables the printing apparatus and the portable terminal to directly communicate with each other without preparing a specific access point. Japanese Patent Application Laid-Open No. 2012-199884 discusses transmission and reception of audio data and photographic data using Wi-Fi Direct.

When the communication partner in Wi-Fi Direct is a printing apparatus, it is possible to send print data to the printing apparatus, and instruct the printing apparatus to print the print data. In performing the printing, various print settings, for example, color printing, two-sided printing, and N-up printing, are to be made. In Japanese Patent Application Laid-Open No. 2012-199884, however, there is no mention of a way how users perform the print setting.

SUMMARY OF THE INVENTION

The present disclosure is directed to providing, in direct wireless communication between an information processing apparatus and a printing apparatus, a system for enabling users to make desired print setting.

According to an aspect of the present disclosure, a printing apparatus capable of performing wireless communication with an information processing apparatus is provided. The printing apparatus includes a display unit configured to display a connection screen for enabling, on the same screen, specification of print data received from the information processing apparatus using the wireless communication, and reception of an instruction for executing connection processing for establishing the wireless communication, a storage unit configured to store the print settings specified via the connection screen, a connection unit configured to execute the connection processing with the information processing apparatus when the instruction for executing the connection processing is received via the connection screen, a reception unit configured to receive print data from the information processing apparatus using the wireless communication established by the connection processing, and a printing unit configured to print the print data received by the reception unit based on the print settings stored in the storage unit.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

FIG. 4 illustrates a processing sequence to be performed between the printing apparatus and the portable terminal in the first exemplary embodiment.

FIGS. 6A and 6B illustrate capability information.

FIG. 9 is a flowchart illustrating processing to be performed by the printing apparatus according to the first exemplary embodiment.

FIG. 10 illustrates a processing sequence to be performed between a printing apparatus and a portable terminal in the second exemplary embodiment.

FIG. 12 is a flowchart illustrating processing to be performed by the printing apparatus according to the second exemplary embodiment.

FIG. 13 illustrates a processing sequence to be performed between a printing apparatus and a portable terminal in the third exemplary embodiment.

FIGS. 14A and 14B illustrate screens to be displayed on an operation panel.

FIG. 15 is a flowchart illustrating processing to be performed by the printing apparatus according to the third exemplary embodiment.

FIG. 16 is a flowchart illustrating processing to be performed by the printing apparatus according to the third exemplary embodiment.

DESCRIPTION OF THE EMBODIMENTS

Various exemplary embodiments, features, and aspects of the disclosure will be described in detail below with reference to the drawings.

The present disclosure is not limited to the exemplary embodiments described below. Further, it is to be understood that not all combinations of features described in the exemplary embodiments below are always necessary to solve the problems in the present disclosure.

Figure 2:
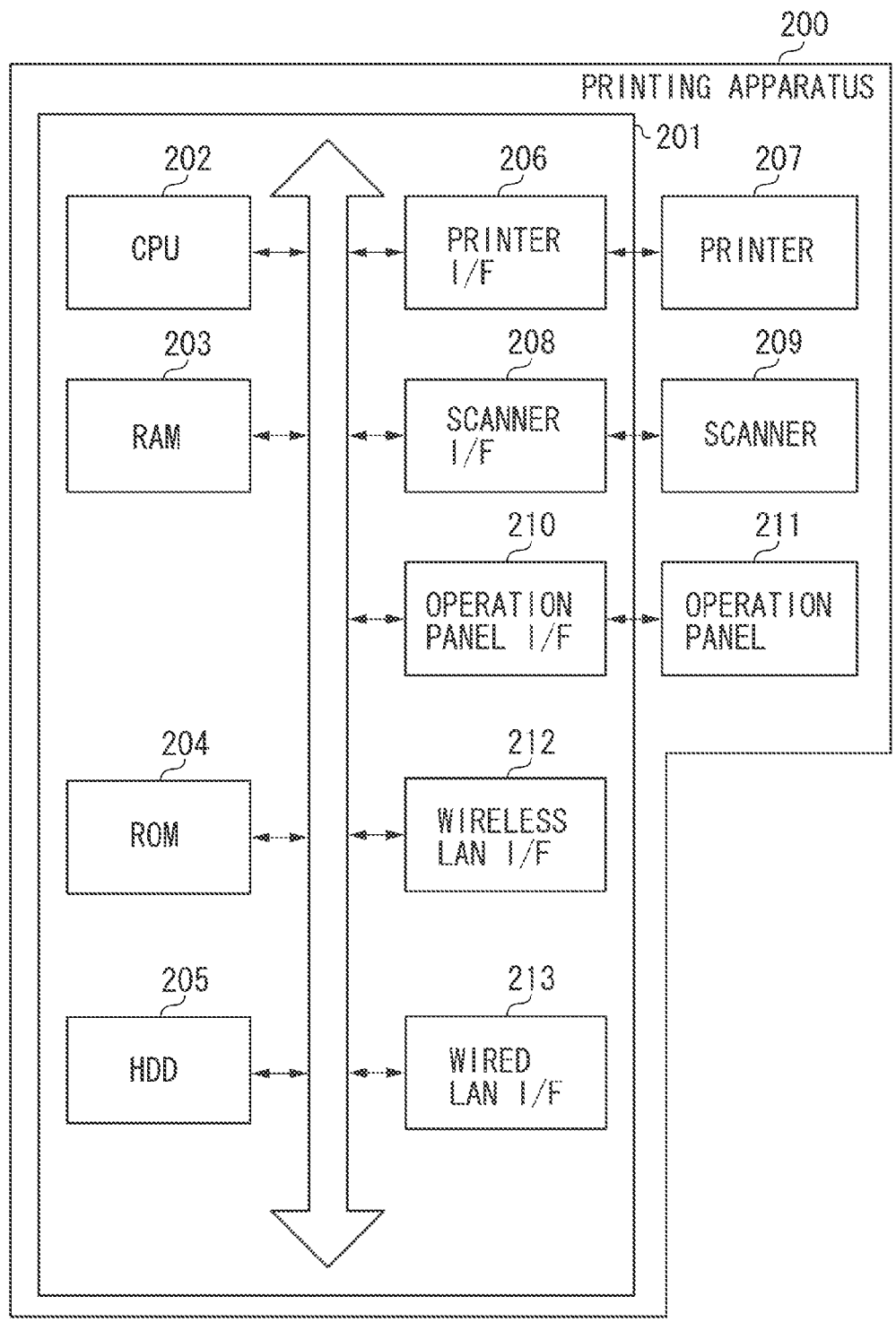
FIG. 2 illustrates a hardware configuration of a printing apparatus.

Hereinafter, the first exemplary embodiment of the present disclosure is described. FIG. 2 illustrates a hardware configuration of a printing apparatus 200. The printing apparatus 200 is an example of an information processing apparatus capable of performing wireless communication with an external device (for example, a portable terminal and a PC). In the present exemplary embodiment, the printing apparatus 200 is a multifunction peripheral. Alternatively, the printing apparatus 200 can be a printer that is not provided with a scanner.

A control unit 201 including a central processing unit (CPU) 202 performs overall control of the printing apparatus 200. The CPU 202 reads a control program stored in a read-only memory (ROM) 204, and performs various kinds of control processes such as communication control. A random access memory (RAM) 203 serves as a temporary memory region such as a main memory, a work area, or the like for the CPU 202. A hard disk drive (HDD) 205 stores data, various programs, and various information tables. As used herein, the term "unit" generally refers to any combination of software, firmware, hardware, or other component that is used to effectuate a purpose.

A printer interface (I/F) 206 connects a printer (printer engine) 207 and the control unit 201. The printer 207, based on print data input via the printer I/F 206, performs print processing on a sheet supplied from a sheet cassette (not illustrated).

A scanner I/F 208 connects a scanner 209 and the control unit 201. The scanner 209 reads a document placed on a platen, and generates image data. The image data generated by the scanner 209 is, for example, printed with the printer 207, stored in the HDD 205, or sent to an external device via a wireless LAN I/F 212 or a wired LAN I/F 213.

An operation unit I/F 210 connects an operation panel 211 and the control unit 201. The operation panel 211 includes a liquid crystal display unit having a touch panel function, a keyboard, and various function keys. Users can check a screen displayed on the operation panel 211, and input various instructions to the printing apparatus 200 using a touch panel.

A wireless LAN I/F 212 performs wireless communication with an external device such as a portable terminal and a PC. The wireless communication enables the printing apparatus 200 to receive print data from the external device. Based on the received print data, the printer 207 performs print processing. The printing apparatus 200 can send the image data generated by a scanner 209 to an external device via the wireless LAN I/F 212.

The wired LAN I/F 213 is connected to a LAN cable (not illustrated), and can perform communication with an external device (not illustrated).

In the printing apparatus 200, one CPU 202 performs various processes illustrated in the flowcharts described below, by using one memory (the RAM 213). Alternatively, other configurations can also be employed. For example, a plurality of CPUs and a plurality of memories can cooperate with each other to perform each process illustrated in the flowcharts described below.

Figure 3:
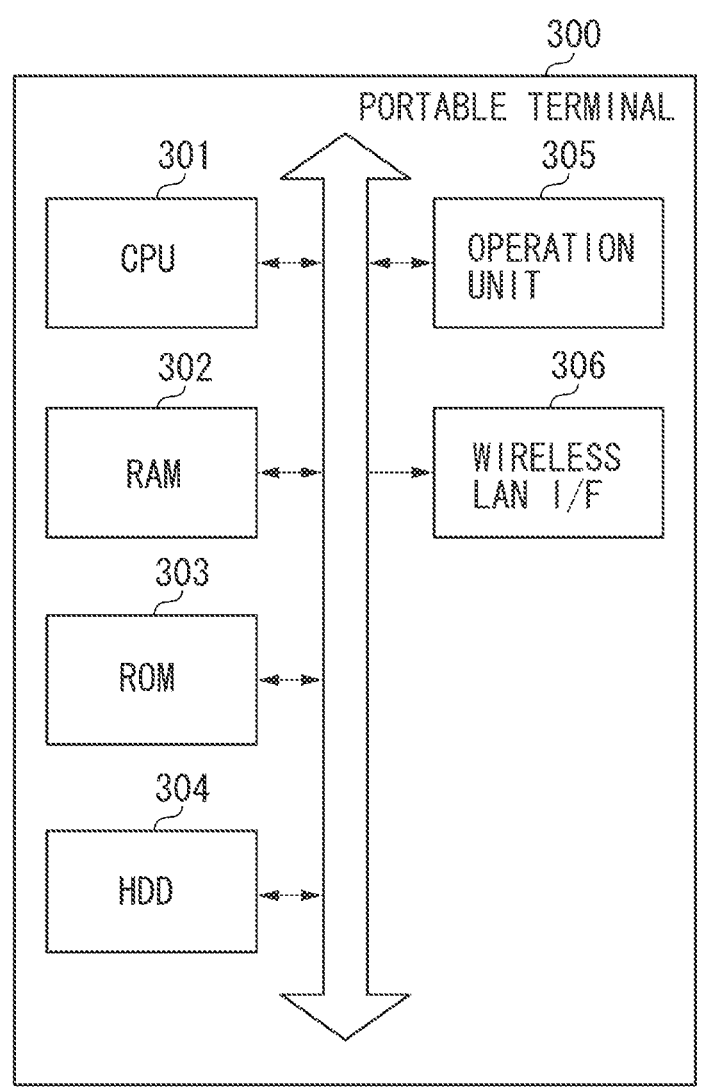
FIG. 3 illustrates a hardware configuration of a portable terminal.

FIG. 3 illustrates a hardware configuration of a portable terminal 300. The portable terminal 300 is, similarly to the printing apparatus 200, an example of the information processing apparatuses capable of performing wireless communication. The portable terminal 300 is, for example, a smart phone, a cellular phone, a tablet, or a digital camera.

A CPU 301 reads a control program stored in a ROM 303, and performs overall operational control of the portable terminal 300. A RAM 302 serves as a temporary memory region for a main memory, a work area, or the like for the CPU 301. An HDD 304 stores data, various programs, and various information tables.

An operation unit 305 may include a liquid crystal display unit having a touch panel function, and hard keys. Users can check a screen displayed on the operation unit 305, and input various instructions to the printing apparatus 200 using the touch panel.

A wireless LAN I/F 306 performs wireless communication with an external device such as the printing apparatus 200. For example, the wireless LAN I/F 306 can send image data stored in a memory such as the HDD 304 as print data to the printing apparatus 200.

In the portable terminal 300, one CPU 301 performs various processes illustrated in the flowcharts described below by using one memory (the RAM 302). Alternatively, other configurations can also be employed. For example, a plurality of CPUs and a plurality of memories can cooperate with each other to perform each process illustrated in the flowcharts described below.

FIG. 4 illustrates a sequence of a series of processes in the printing system according to the present exemplary embodiment. In the present exemplary embodiment, the printing apparatus 200 and the portable terminal 300 perform, as wireless communication, Wi-Fi Direct described with reference to FIG. 1.

Figure 1:
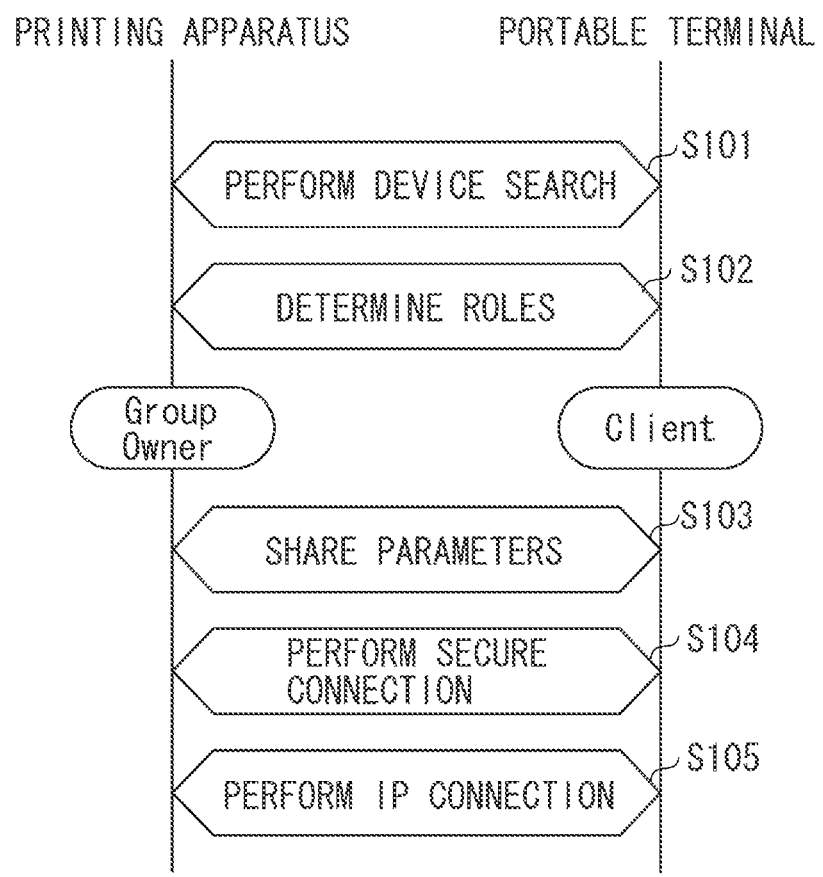
FIG. 1 illustrates a processing sequence in Wi-Fi Direct.

When in each of the printing apparatus 200 and the portable terminal 300, a user instructs execution of Wi-Fi Direct, the printing apparatus 200 and the portable terminal 300 respectively execute the device search illustrated in step S401. The device search enables the printing apparatus 200 and the portable terminal 300 to identify each other as the communication partners. In step S401, the processing illustrated in step S101 in FIG. 1 is to be executed.

Figure 5A:
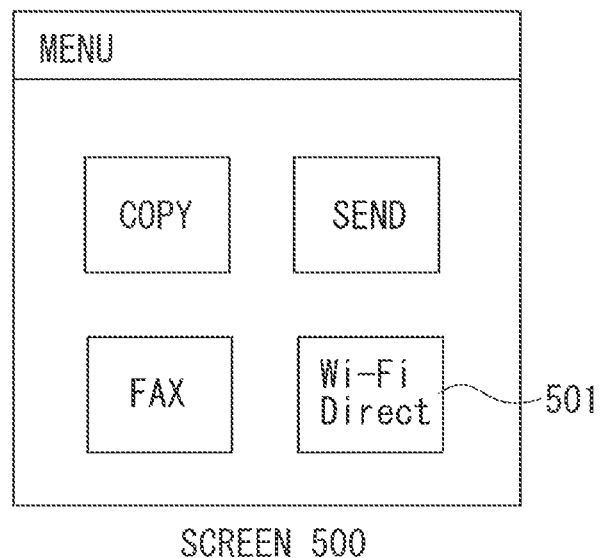
FIGS. 5A and 5B illustrate screens to be displayed on an operation panel.

In the present exemplary embodiment, via the screens displayed on the printing apparatus 200 and the portable terminal 300, the user instructs to start execution of Wi-Fi Direct. A screen 500 illustrated in FIG. 5A is a screen to be displayed on the operation panel 211 of the printing apparatus 200. The user uses the screen 500 to select a function to be used from a plurality of functions provided by the printing apparatus 200. For example, the user selects an icon 501 by performing a touch operation to use Wi-Fi Direct in the printing apparatus 200.

Figure 5B:
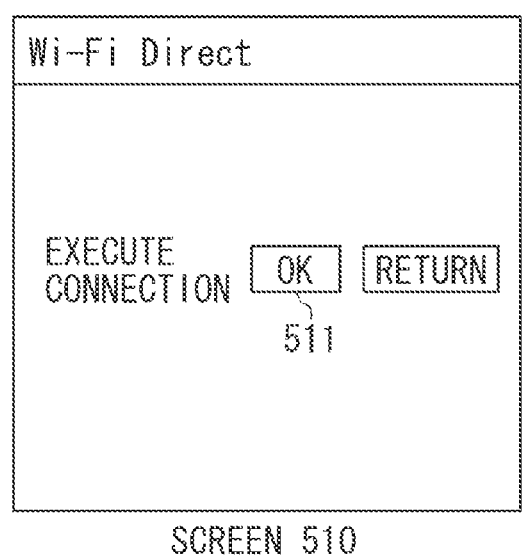

When the user selects the icon 501, a screen 510 illustrated in FIG. 5B is displayed on the operation panel 211. When the user selects an icon 511, an instruction for starting the execution of wireless communication (Wi-Fi Direct) is issued. On an operation unit 305 of the portable terminal 300, a screen similar to the screen 510 is displayed, and the user can instruct the start of the execution of the wireless communication (Wi-Fi Direct).

When the printing apparatus 200 and the portable terminal 300 are identified as the communication partners by the device search in step S401, the wireless connection illustrated in step S402 is performed. The wireless connection in step S402 establishes the wireless communication between the printing apparatus 200 and the portable terminal 300. In step S402, the processing illustrated in step S102 to S105 in FIG. 1 is performed.

Specifically, first, a determination is made whether the printing apparatus 200 or the portable terminal 300 is to be an access point (Group Owner) or a client (Client). Then, parameter sharing between the printing apparatus 200 and the portable terminal 300 is performed, and using the parameters, secure connection is performed. In completion of the secure connection, addressing for IP communication between the printing apparatus 200 and the printing terminal 300 is performed. In this step, the apparatus that acts as the Group Owner assigns an IP address to the apparatus that acts as the Client. The wireless connection establishes the wireless communication between the printing apparatus 200 and the portable terminal 300.

In response to the establishment of the wireless communication in step S402, in step S403, the printing apparatus 200 sends capability information to the portable terminal 300. The capability information is the information for the portable terminal 300 to specify the print settings supported by the printing apparatus 200. For example, in the case where the printing apparatus 200 sends the capability information 600 in FIG. 6A to the portable terminal 300, the information indicates that the printing apparatus 200 supports color printing, two-sided printing (long-edge binding, and short-edge binding), and N-up printing (2 in 1, and 4 in 1). In the case of the capability information 610 in FIG. 6B, the printing apparatus 200 supports N-up printing (2 in 1), and does not support color printing and two-sided printing.

In step S404, the portable terminal 300 that has received the capability information sent from the printing apparatus 200 in step S403 generates a print setting screen based on the received capability information. In step S405, the portable terminal 300 displays the generated print setting screen, and the user sets print settings on the displayed print setting screen. In response to a user's instruction to start the printing, in step S406, the portable terminal 300 sends the print data to the printing apparatus 200. In step S407, the printing apparatus 200 performs the printing. The processing to be performed in step S404 to step S407 is described in detail with reference to the flowcharts illustrated in FIG. 7 and FIGS. 8A and 8B.

Figure 7:
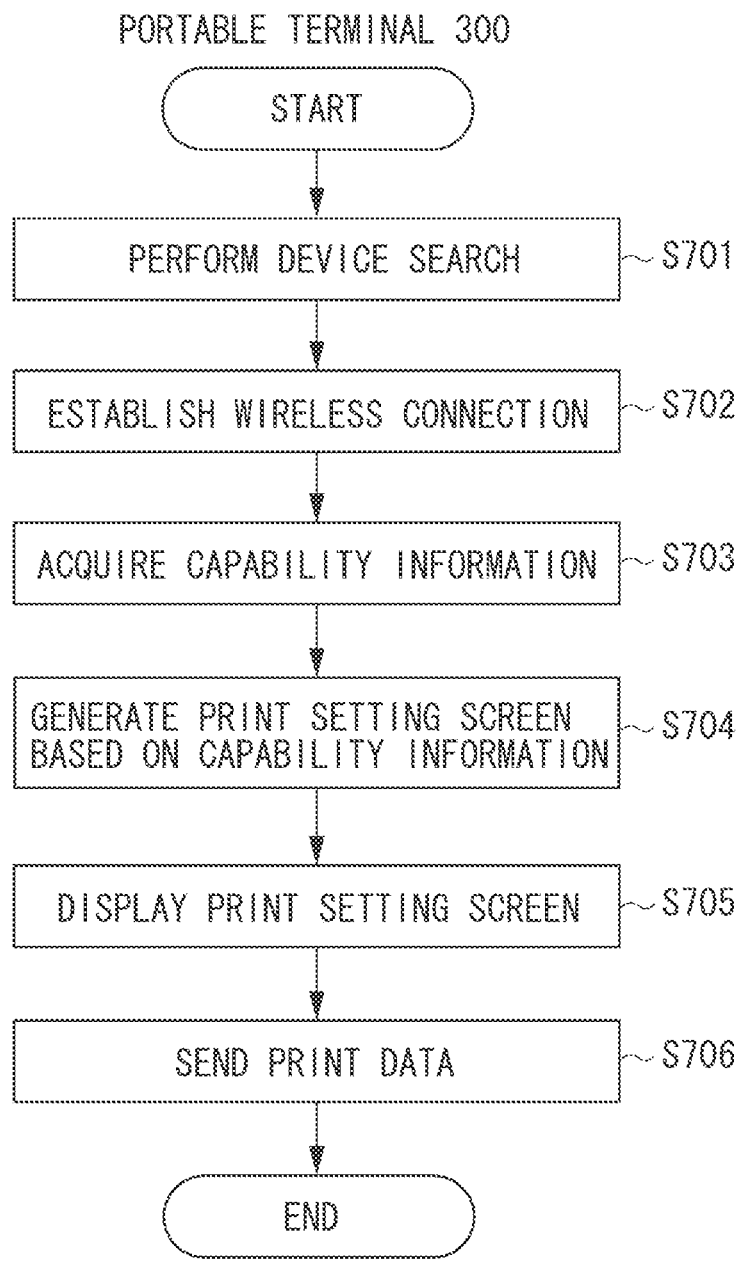
FIG. 7 is a flowchart illustrating processing to be performed by the portable terminal according to the first exemplary embodiment.

FIG. 7 is a flowchart illustrating processing to be performed in the portable terminal 300 when print data is sent from the portable terminal 300 to the printing apparatus 200 and printing is performed. Each step in FIG. 7 is performed by the CPU 301 expanding a program stored in a memory such as the ROM 303, in the RAM 302 and implementing the program.

When the user instructs to start the execution of Wi-Fi Direct with the portable terminal 300, in step S701, the wireless LAN I/F 306 in the portable terminal 300 performs device search. The device search to be performed in step S701 corresponds to the processing in step S401 in FIG. 4. In the present exemplary embodiment, at the same timing as step S701, the printing apparatus 200 similarly performs device search, and consequently, by the device search in step S701, the printing apparatus 200 is specified as a communication partner.

In step S702, the wireless LAN I/F 306 establishes wireless communication with the printing apparatus 200 that has been specified as the communication partner. The establishment of the wireless communication performed in step S702 corresponds to the processing in step S402 in FIG. 4. The establishment of the wireless communication enables the portable terminal 300 and the printing apparatus 200 to directly communicate with each other.

In step S703, the wireless LAN I/F 306, using the wireless communication established in step S702, acquires the capability information of the printing apparatus 200 from the printing apparatus 200. In the present exemplary embodiment, it is assumed that the portable terminal 300 sends a request for the capability information to the printing apparatus 200. Alternatively, at a predetermined timing (for example, when the wireless communication is established), the printing apparatus 200 can actively send the capability information to the portable terminal 300.

When the capability information is acquired from the printing apparatus 200, in step S704, the CPU 301 generates a print setting screen based on the acquired capability information. In step S705, the operation unit 305 displays the print setting screen generated in step S704.

Figure 8A:
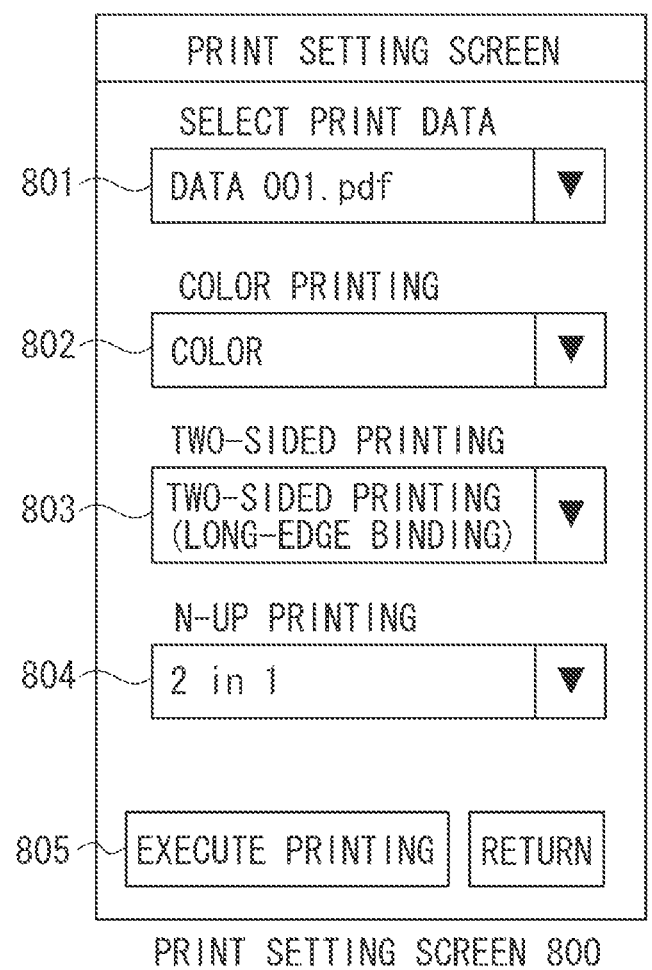
FIGS. 8A and 8B illustrate print setting screens.

The print setting screen 800 in FIG. 8A is a print setting screen to be generated in step S704 when the capability information 600 in FIG. 6A is acquired. The screen 800 is displayed on the operation unit 305. In the item 801 on the print setting screen 800, from the data stored in a memory such as the HDD 304 in the portable terminal 300, the user can select data to be printed.

In the item 802, item 803, and item 804, the user can set color printing, two-sided printing, and N-up printing, respectively. According to the capability information 600 acquired from the printing apparatus 200 in step S703, the printing apparatus 200 can perform all of the color printing, two-sided printing, and N-up printing. Consequently, in the item 802, item 803, and item 804, using the pull-down menu, the user can set color printing, two-sided printing, and N-up printing.

Figure 8B:
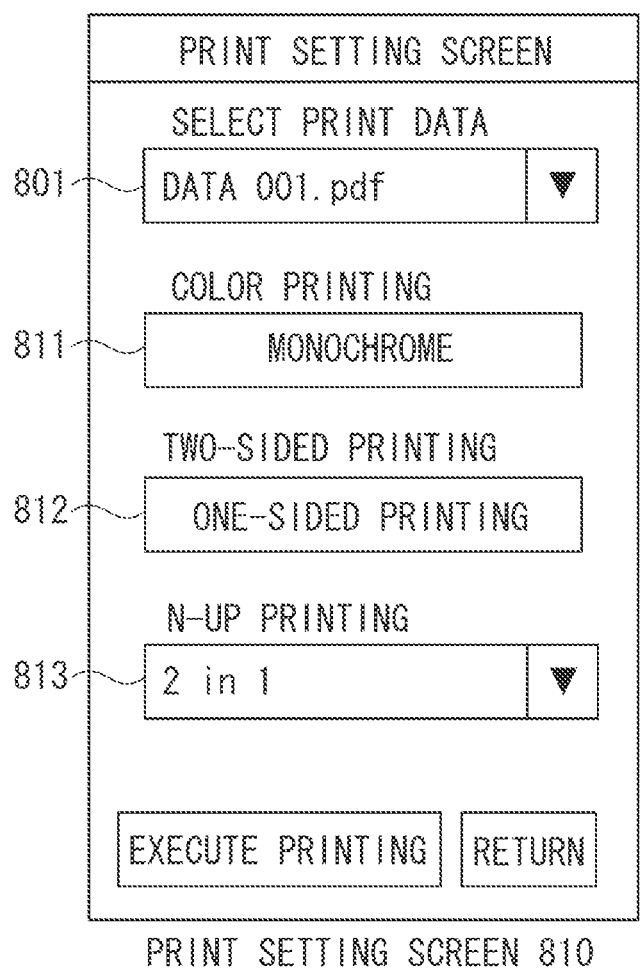

The print setting screen 810 in FIG. 8B is a print setting screen to be generated in step S704 when the capability information 610 in FIG. 6B is acquired. The screen 810 is displayed on the operation unit 305. Different from the capability information 600, the capability information 610 does not support color printing and two-sided printing. Consequently, on the print setting screen 810, in the item 811 (color printing) and item 812 (two-sided printing), pull-down menus are not displayed to prevent the user from specifying the print setting not being supported.

In step S705, the operation unit 305 displays a print setting screen (for example, the print setting screen 800 and the print setting screen 810), and the user can set desired print settings. After the completion of the print setting, when the user instructs to perform the printing (for example, selects the item 805), in step S706, the wireless LAN I/F 306 sends the print data to the printing apparatus 200. The printing apparatus 200 receives the print data sent in step S706, and based on the print settings, performs the print processing.

FIG. 9 is a flowchart illustrating processing to be performed in the printing apparatus 200 when the print data is sent from the portable terminal 300 to the printing apparatus 200 and printing is performed. Each step in FIG. 9 is performed by the CPU 202 expanding a program stored in a memory such as the ROM 204 in the RAM 203 and implementing the program.

When the user instructs to start the execution of Wi-Fi Direct with the printing apparatus 200, in step S901, the wireless LAN I/F 212 in the printing apparatus 200 performs device search. The device search to be performed in step S901 corresponds to the processing in step S401 in FIG. 4. In the present exemplary embodiment, at the same timing as step S901, the portable terminal 300 similarly performs device search, and consequently, by the device search in step S901, the portable terminal 300 is to be specified as a communication partner.

In step S902, the wireless LAN I/F 212 establishes wireless communication with the portable terminal 300 that has been specified as the communication partner. The establishment of the wireless communication performed in step S902 corresponds to the processing in step S402 in FIG. 4. The establishment of the wireless communication enables the printing apparatus 200 and the portable terminal 300 to directly communicate with each other.

In step S903, the wireless LAN I/F 212, using the wireless communication established in step S902, sends the capability information of the printing apparatus 200 to the portable terminal 300. In the present exemplary embodiment, the portable terminal 300 issues a request for the capability information to the printing apparatus 200, and the printing apparatus 200 responds to the request and thereby the processing in step S903 is implemented. Alternatively, the other methods can be employed. For example, in response to establishment of wireless communication between the printing apparatus 200 and the portable terminal 300, the printing apparatus 200 can actively send the capability information to the portable terminal 300.

In step S904, the wireless LAN I/F 212 receives the print data sent from the portable terminal 300. In step S905, based on the print settings set in the portable terminal 300, the printer 207 performs the print processing of the received print data.

As described above, according to the exemplary embodiment, after the establishment of the wireless communication in Wi-Fi Direct between the printing apparatus 200 and the portable terminal 300, the printing apparatus 200 sends the capability information of the printing apparatus 200 itself to the portable terminal 300. Based on the received capability information, the portable terminal 300 generates a print setting screen and displays the screen. Consequently, using the print setting screen suitable for the printing apparatus 200, the user can perform the print setting.

In the first exemplary embodiment, the configuration in which the portable terminal 300 acquires the capability information from the printing apparatus 200, and based on the acquired capability information, displays a print setting screen. In the first exemplary embodiment, however, to the portable terminal 300, a special configuration for implementing the function of acquiring the capability information from the printing apparatus 200, and the function of displaying a print setting screen based on the acquired capability information is to be provided. In the second exemplary embodiment, in the execution of Wi-Fi Direct, instead of the portable terminal 300, in the printing apparatus 200, the user sets desired print settings.

FIG. 10 illustrates a sequence of a series of processes in a printing system according to the present exemplary embodiment. The configurations of the printing apparatus 200 and the portable terminal 300 are similar to those in the first exemplary embodiment (the configurations described with reference to FIGS. 2 and 3), and accordingly, their descriptions are omitted.

Figure 11:
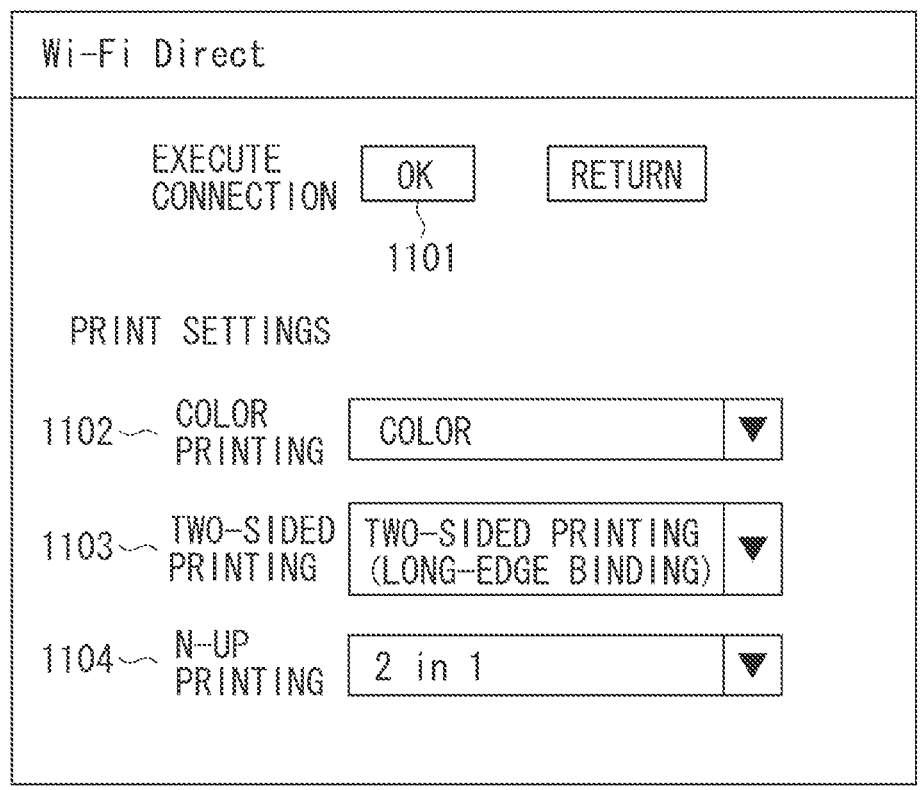
FIG. 11 illustrates a screen to be displayed on an operation panel.

A screen 1100 in FIG. 11 is displayed on the operation panel 211 in the printing apparatus 200. The screen 110 is used to instruct the start of the execution of Wi-Fi Direct. When the user selects an icon 1101, an instruction for starting the execution of Wi-Fi Direct can be issued.

In addition to the icon 1101, on the screen 1100, items 1102 to 1104 are displayed. The items 1102 to 1104 are provided for a user to set print settings of print data to be received via Wi-Fi Direct in advance prior to the reception of the print data. In the present exemplary embodiment, as the print settings, color printing, two-sided printing, and N-up printing can be set. Using the pull-down menus of the items 1102 to 1104, the user can set desired print settings.

On the screen 1100, when the user performs print setting and selects the icon 1101, in step S1001, the printing apparatus 200 stores the print settings set by the user. In step S1002, the printing apparatus 200 performs device search. In the portable terminal 300, the execution of Wi-Fi Direct is instructed at the same timing, and in step S1002, the portable terminal 300 similarly performs device search.

The device search in step S1002 enables the printing apparatus 200 and the portable terminal 300 to identify the communication partners with each other. In step S1003, the printing apparatus 200 and the portable terminal 300 perform wireless connection. The wireless connection in step S1003 establishes the wireless communication between the printing apparatus 200 and the portable terminal 300.

When the wireless communication is established, in step S1004, with the portable terminal 300, the user selects print data to be sent to the printing apparatus 200. When the user selects the print data, in step S1005, the portable terminal 300 sends the print data selected by the user to the printing apparatus 200. In step S1006, the printing apparatus 200 that has received the print data performs the print processing of the received print data. In this processing, based on the print settings stored in the printing apparatus 200 in advance in step S1001, the printing apparatus 200 performs the print processing.

As described above, in the printing apparatus 200, in issuing an instruction for starting the execution of Wi-Fi Direct, the print setting is performed in advance. This enables the execution of the print processing based on the print settings set by the user without performing the print setting in the portable terminal 300.

FIG. 12 is a flowchart illustrating processing to be performed in the printing apparatus 200 when the print data is sent from the portable terminal 300 to the printing apparatus 200 and printing is performed. Each step in FIG. 12 is performed by the CPU 202 expanding a program stored in a memory such as the ROM 204, in the RAM 203 and implementing the program.

In step S1201, in response to a user's operation, the operation panel 211 displays the screen 1100 in FIG. 11. Using the items 1102 to 1104 on the screen 1100, the user can set desired print settings. After the completion of the print setting, when the user selects the icon 1101, in step S1202, the CPU 202 stores the print settings made by the user in a memory such as the HDD 205. In step S1203, the wireless LAN I/F 212 performs device search. In the present exemplary embodiment, at the same timing as step S1203, the portable terminal 300 similarly performs device search, and consequently, by the device search in step S1203, the portable terminal 300 is to be specified as a communication partner.

In step S1204, the wireless LAN I/F 212 establishes wireless communication with the portable terminal 300 that has been specified as the communication partner. The establishment of the wireless communication enables the printing apparatus 200 and the portable terminal 300 to directly communicate with each other.

In step S1205, the wireless LAN I/F 212 receives the print data sent from the portable terminal 300. In step S1206, the printer 207 performs the print processing of the received print data. In this processing, based on the print settings (that is, the print settings set by the user in advance in the printing apparatus 200) stored in advance in a memory such as the HDD 205 in step S1202, the printer 207 performs the print processing.

As described above, in the present exemplary embodiment, the user can set the print settings in advance in the printing apparatus 200. This enables the user to execute the print processing based on the desired print settings without setting the print settings in the portable terminal 300.

Further, according to the exemplary embodiment, as in the screen 1100, the instruction for executing Wi-Fi Direct and the print setting can be performed on the same screen. Consequently, as compared to a case where the instruction for executing Wi-Fi Direct and the print setting are performed on different screens respectively, the work of the user can be reduced.

If the instruction for executing Wi-Fi Direct and the print setting are performed on different screens, the user may issue an instruction for executing Wi-Fi Direct without performing the print setting. The exemplary embodiment can prevent the problem.

In the third exemplary embodiment, a modification of the second exemplary embodiment is described.

FIG. 13 illustrates a sequence of a series of processes in the printing system according to the present exemplary embodiment. The configurations of the printing apparatus 200 and the portable terminal 300 are similar to those in the first exemplary embodiment (the configurations described with reference to FIGS. 2 and 3), and accordingly, their descriptions are omitted.

In step S1301, the printing apparatus 200 and the portable terminal 300 performs device search. The device search enables the printing apparatus 200 and the portable terminal 300 to identify the communication partners with each other. In step S1302, the printing apparatus 200 and the portable terminal 300 performs wireless connection. The wireless connection establishes the wireless communication between the printing apparatus 200 and the portable terminal 300.

When the wireless communication is established, in step S1303, the user selects print data to be sent to the printing apparatus 200, with the portable terminal 300. When the user selects the print data, in step S1304, the portable terminal 300 sends the print data selected by the user to the printing apparatus 200.

The printing apparatus 200 that has received the print data, in step S1305, stores the received print data in a memory such as the HDD 205 without immediately printing the received print data. The print data stored in step S1305 enters a print standby state until the printing apparatus 200 receives an instruction for executing printing from the user. In response to reception of an instruction for executing the printing from the user, the print data is to be printed.

Figure 14A:
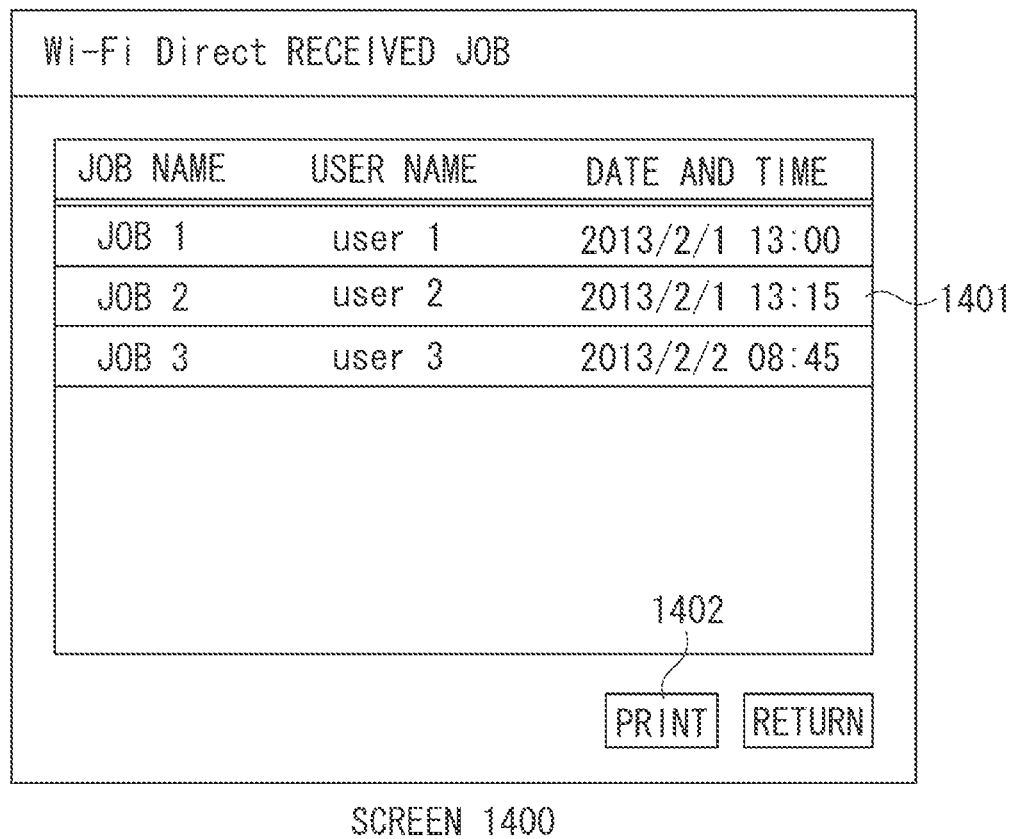

A screen 1400 in FIG. 14A is displayed on the operation panel 211. In an area 1401 in the screen 1400, a list of print data stored in the printing apparatus 200 in step S1305 is displayed. The screen 1400 enables the user to check the print data in the print standby state received via Wi-Fi Direct. In step S1306, the user selects desired print data from the list of the print data displayed in the area 1401 and presses an icon 1402 to input to the printing apparatus 200, an instruction for executing the printing of the print data stored in the printing apparatus 200.

In step S1307, the printing apparatus 200 that has received the print execution instruction displays a screen 1410 in FIG. 14B. The screen 1410 is for the user to make print settings in printing the print data stored in the printing apparatus 200. Using items 1411 to 1413, the user can set, as the print settings, color printing, two-sided printing, and N-up printing. After the completion of the print setting, when the user selects an icon 1414, in step S1308, based on the print data set on the screen 1410, the printing apparatus 200 prints the print data selected in the area 1401.

As described above, the printing apparatus 200 stores the print data received via Wi-Fi Direct once without immediately printing the data. Consequently, when the user issues a print instruction later, the user can set desired print settings.

FIG. 15 is a flowchart illustrating processing to be performed in the printing apparatus 200 when the printing apparatus 200 receives print data sent from the portable terminal 300. Each step in the flowchart in FIG. 15 is performed by the CPU 202 expanding a program stored in a memory such as the ROM 204 in the RAM 203 and implementing the program.

When the user instructs the printing apparatus 200 to start the execution of Wi-Fi Direct in step S1501, the wireless LAN I/F 212 in the printing apparatus 200 performs device search. In the present exemplary embodiment, at the same timing as step S1501, the portable terminal 300 similarly performs device search. Consequently, by the device search in step S1501, the portable terminal 300 is specified as a communication partner.

In step S1502, the wireless LAN I/F 212 establishes wireless communication with the portable terminal 300 that has been specified as the communication partner. The establishment of the wireless communication enables the printing apparatus 200 and the portable terminal 300 to directly communicate with each other.

In step S1503, the wireless LAN I/F 212 receives the print data sent from the portable terminal 300. In step S1504, the CPU 202 stores the received print data in a memory such as the HDD 205 without printing the data. The print data stored in step S1504 enters a print standby state until the CPU 202 receives an instruction for executing the printing from the user. In response to reception of an instruction for executing the printing from the user, the print data is to be printed.

With reference to the flowchart in FIG. 16, processing to be performed in printing the print data (the print data stored without being printed in step S1504 in FIG. 15) stored in the printing apparatus 200 is described. Each step in the flowchart in FIG. 16 is performed by the CPU 202 expanding a program stored in a memory such as the ROM 204 in the RAM 203 and implementing the program.

In step S1601, the operation panel 211 displays the print data stored in the printing apparatus 200. In the present exemplary embodiment, the operation panel 211 displays the screen 1400 in FIG. 14. In step S1602, the CPU 202 receives an instruction for executing the printing of the stored print data (the print data stored without being printed in step S1504 in FIG. 15) from the user via the screen 1400. In the present exemplary embodiment, when the printing apparatus 200 stores a plurality of pieces of print data, in step S1602, an instruction for executing the printing of the print data selected by the user in the area 1401 is received.

In step S1602, the printing apparatus 200 receives an instruction for executing the printing. In step S1603, the operation panel 211 displays a print setting screen. In the present exemplary embodiment, the operation panel 211 displays the screen 1410 in FIG. 14B. Using the items 1411 to 1413 on the screen 1410, the user can set desired print settings.

On the screen 1410, when the user who performed the print setting selects an icon 1414, in step S1604, the printer 207 prints the print data stored in the printing apparatus 200. In this processing, the printer 207 performs the printing based on the print settings made by the user on the screen 1410. In the present exemplary embodiment, when the printing apparatus 200 stores a plurality of pieces of print data, in step S1604, the printing apparatus 200 prints the print data selected by the user in the area 1401 on the screen 1400.

As described above, according to the exemplary embodiment, the printing apparatus 200 once stores the print data received via Wi-Fi Direct once without immediately printing the data. Consequently, when the user issues an instruction for executing the printing later, the user can set desired print settings.

Other Exemplary Embodiments

In the above-described exemplary embodiments, the printing apparatus 200 and the portable terminal 300 perform Wi-Fi Direct as wireless communication, however, the wireless communication is not limited to Wi-Fi Direct. As in Wi-Fi Direct, as long as a plurality of communication apparatuses can perform direct communication, any wireless communication can be employed in the present disclosure.

According to the exemplary embodiments of the present disclosure, in direct wireless communication between an information processing apparatus and a printing apparatus, a user can make desired print settings.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-033422 filed Feb. 22, 2013, which is hereby incorporated by reference herein in its entirety.

What is claimed is:

1. A printing apparatus comprising:
a direct wireless communication unit configured to execute direct wireless communication between an external apparatus and the printing apparatus;
a display unit configured to display a connection screen allowing a user to input both a specification of a print setting and an instruction for causing the direct wireless communication unit to execute the direct wireless communication;
a controlling unit configured to control the direct wireless communication unit to establish the direct wireless communication between the external apparatus and the printing apparatus in a case where the instruction for causing the direct wireless communication unit to execute the direct wireless communication is input by a user via the connection screen; and
a printing unit configured to execute, in a case where the printing apparatus receives print data from the external apparatus via the direct wireless communication, printing processing based on the print setting specified by the user via the connection screen.

2. The printing apparatus according to claim 1, wherein the direct wireless communication is wireless communication based on Wi-Fi Direct.

3. The printing apparatus according to claim 1, wherein, in a case where the printing apparatus executes the direct wireless communication, either the printing apparatus or the external apparatus operates as an access point.

4. The printing apparatus according to claim 1, wherein the print setting which is able to be specified by the user via the connection screen includes two-sided printing.

5. The printing apparatus according to claim 1, wherein the print setting which is able to be specified by the user via the connection screen includes color printing.

6. The printing apparatus according to claim 1, wherein the print setting which is able to be specified by the user via the connection screen includes N-up printing.

7. A method for controlling a printing apparatus, the method comprising:
executing direct wireless communication between an external apparatus and the printing apparatus;
displaying a connection screen allowing a user to input both a specification of a print setting and an instruction for causing the executing to execute the direct wireless communication;
establishing the direct wireless communication between the external apparatus and the printing apparatus in a case where the instruction for causing the direct wireless communication unit to execute the direct wireless communication is input by a user via the connection screen; and
executing, in a case where the printing apparatus receives print data from the external apparatus via the direct wireless communication, printing processing based on the print setting specified by the user via the connection screen.

8. A non-transitory storage medium storing a program for instructing a computer to execute a method comprising:
executing direct wireless communication between an external apparatus and the printing apparatus;

displaying a connection screen allowing a user to input both a specification of a print setting and an instruction for causing the executing to execute the direct wireless communication;

establishing the direct wireless communication between the external apparatus and the printing apparatus in a case where the instruction for causing the direct wireless communication unit to execute the direct wireless communication is input by a user via the connection screen; and executing, in a case where the printing apparatus receives print data from the external apparatus via the direct wireless communication, printing processing based on the print setting specified by the user via the connection screen.

* * * * *